US010680838B2

(12) United States Patent
Lövsén et al.

(10) Patent No.: US 10,680,838 B2
(45) Date of Patent: Jun. 9, 2020

(54) AGGREGATED HANDLING OF QUOTA IN A NETWORK NODE

(71) Applicant: Telefonaktiebolaget LM Ericsson (publ), Stockholm (SE)

(72) Inventors: Lars Lövsén, Göteborg (SE); Sune Gustafsson, Mölnlycke (SE); Helen Örtenblad, Göteborg (SE); Jiehong Yang, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/317,375

(22) PCT Filed: Jul. 13, 2016

(86) PCT No.: PCT/EP2016/066614
§ 371 (c)(1),
(2) Date: Jan. 11, 2019

(87) PCT Pub. No.: WO2018/010780
PCT Pub. Date: Jan. 18, 2018

(65) Prior Publication Data
US 2019/0305975 A1      Oct. 3, 2019

(51) Int. Cl.
*H04L 12/14*      (2006.01)
*H04L 12/26*      (2006.01)
(Continued)

(52) U.S. Cl.
CPC ...... *H04L 12/1403* (2013.01); *H04L 12/1435* (2013.01); *H04L 12/1446* (2013.01);
(Continued)

(58) Field of Classification Search
CPC ............. H04L 12/1403; H04L 12/1446; H04L 12/1457; H04L 12/1467; H04L 12/1475;
(Continued)

(56) References Cited

U.S. PATENT DOCUMENTS

2008/0319783 A1* 12/2008 Yao ................... G06Q 30/0281
705/346
2010/0075630 A1    3/2010 Tillitt et al.
(Continued)

FOREIGN PATENT DOCUMENTS

EP       2 981 108 A1    2/2016

OTHER PUBLICATIONS

International Search Report and Written Opinion issued in International Application No. PCT/EP2016/066614, dated Mar. 9, 2017, 11 pages.

*Primary Examiner* — Congvan Tran
(74) *Attorney, Agent, or Firm* — Rothwell, Figg, Ernst & Manbeck, P.C.

(57)      ABSTRACT

The invention relates to a method performed by a network node of managing online charging, and a network node performing the method. In an aspect of the invention, a method performed by a network node of managing online charging of sponsored data connectivity is provided. The method comprises receiving (S101) a user request for service related to the sponsored data connectivity, estimating (S102) a number of users that are expected to use said service, and acquiring (S103), from an Online Charging System authorizing access to the sponsored data connectivity, authorisation for the estimated number of users that are expected to use said service. The method further comprises granting (S104) the user access to the requested service with quota received with the authorisation from said Online Charging System, said quota being valid for a specified time period, and further granting (S104b) any further user requesting (S101b) said service access to the requested service with quota received with the authorisation until total quota authorised by the Online Charging System for the estimated number of users has been apportioned.

20 Claims, 5 Drawing Sheets

(51) Int. Cl.
*H04W 4/24* (2018.01)
*H04M 15/00* (2006.01)

(52) U.S. Cl.
CPC ...... *H04L 12/1457* (2013.01); *H04L 12/1467* (2013.01); *H04L 12/1475* (2013.01); *H04L 12/1478* (2013.01); *H04L 43/062* (2013.01); *H04M 15/44* (2013.01); *H04M 15/64* (2013.01); *H04M 15/7652* (2013.01); *H04M 15/783* (2013.01); *H04M 15/8083* (2013.01); *H04W 4/24* (2013.01); *H04L 12/1496* (2013.01)

(58) Field of Classification Search
CPC .............. H04L 12/1496; H04M 15/64; H04M 15/7652; H04M 15/783
USPC .................................................. 455/405–409
See application file for complete search history.

(56) References Cited

U.S. PATENT DOCUMENTS

| | | | |
|---|---|---|---|
| 2013/0326061 A1* | 12/2013 | Li | H04L 12/1407 709/224 |
| 2014/0095690 A1 | 4/2014 | Saker et al. | |
| 2015/0004928 A1* | 1/2015 | Bejerano | H04M 15/781 455/405 |
| 2015/0105045 A1 | 4/2015 | Rolfe et al. | |
| 2015/0154631 A1* | 6/2015 | Umeda | G06Q 30/0243 705/14.42 |
| 2016/0072963 A1* | 3/2016 | Cai | H04L 12/1407 370/259 |
| 2016/0212277 A1* | 7/2016 | Lopez | H04M 15/835 |
| 2016/0373590 A1* | 12/2016 | Oltmanns | H04L 12/1407 |
| 2017/0178197 A1* | 6/2017 | Hong | G06Q 30/0269 |

* cited by examiner

AGGREGATED HANDLING OF QUOTA IN A NETWORK NODE

CROSS REFERENCE TO RELATED APPLICATION(S)

This application is a 35 U.S.C. § 371 National Stage of International Patent Application No. PCT/EP2016/066614, filed Jul. 13, 2016.

TECHNICAL FIELD

The invention relates to a method performed by a network node of managing online charging, and a network node performing the method.

BACKGROUND

In present mobile communications networks, such as 3rd Generation Partnership Project (3GPP) communications networks including Global System for Mobile communication (GSM), Universal Mobile Telecommunications Service (UMTS) or Long Term Evolution (LTE), each user (i.e. subscribe)r is subject to charging and billing for individual network resource usage.

GSM/UMTS/LTE networks provide functions that implement offline and/or online charging mechanisms for the user's network resource usage in the form of for instance a voice call of certain duration, the transport of a certain volume of data, the submission of a Multimedia Messaging Service (MMS) of a certain size, etc.

In both offline and online charging, charging information for network resource usage is collected concurrently with that resource usage.

However, in offline charging, the resource usage is reported from the network after the resource usage has occurred for the purpose of subscriber billing. Hence, offline charging is a mechanism where charging information does not affect, in real-time, the service rendered.

To the contrary, in online charging, a subscriber account, located in an online charging system, is queried prior to granting permission to use the requested network resource(s). Thus, authorization for the network resource usage must be obtained by the network prior to the actual resource usage to occur. This authorization is granted by a so called Online Charging System (OCS) upon request from the network and may be limited in scope (e.g. volume of data or duration), therefore the authorization may have to be renewed from time to time as long as the user's network resource usage persists.

FIG. 1 illustrates an online charging architecture of a 3GPP network. As is illustrated, offline and online charging mechanisms are implemented on three levels: (1) bearer level in the core network (CN) domain, e.g. in Evolved Packet Core (EPC) in LTE, (2) service level, e.g. as MMS, and (3) subsystem level, e.g. in Internet Protocol Multimedia System (IMS).

A Charging Trigger Function (CTF) 10 generates charging events based on the observation of a user's network resource usage and forwards the charging events to an Online Charging Function (OCF) 11 of an Online Charging System (OCS) 12 in order to obtain authorisation for the chargeable event/network resource usage requested by the user.

The authorisation returned by the OCF 11 to the CTF 10 comprises a so called quota, i.e. an apportionment of the amount of network resources allowed to be consumed by the user. Thus, in practice, the OCF 11 reserves credit from a subscriber account and returns the corresponding quota (e.g. units specifying the number of minutes or bytes allowed for the requested service) to the CTF 10, which in its turn uses the provided quota to supervise the actual network resource consumption.

When the quota is used up, the CTF 10 either issues another charging event, requesting further units to be apportioned, or terminates the session—e.g. a voice call, an IMS session, or an IP connectivity access network (IP CAN) session—associated with the quota (or requests some other network element to terminate the session) if previously instructed to do so by the OCF 11. Once the session is terminated, the consumed units are reported back to the OCF 11 with a final charging event. The credit control session is then terminated, and the OCF 11 returns the value of any unused quota (as reported by the CTF 10) to the subscriber's account.

FIG. 1 further illustrates that the OCS 12 comprises a Rating Function (RF) 13 for determining a value of the network resource usage described in the charging event received by the OCF 11 from the network, on behalf of the OCF 11. The various interfaces, commonly known as reference points, between the illustrated logical charging functions are denoted $R_o$/CAP, $R_c$ and $R_e$.

The OCS 12 further comprises an Account Balance Management Function (ABMF) 14, which is where the subscriber's account balance is located within the OCS 12.

It is also possible to have a $3^{rd}$ party pay the bill of the user, for instance a so called over-the-top (OTT) service provider, such as Netflix, Spotify, Facebook, etc. This is commonly referred to as sponsored data connectivity, where the $3^{rd}$ party (a.k.a. sponsor) has a business relationship with the network operator and reimburses the operator for the user's data connectivity to a service provided by the sponsor (or alternatively that, the user pays for the connectivity with a transaction which is separate from the subscriber's normal charging in the network).

In case of sponsored data connectivity, the CTF 10 reports sponsored use of network resources together with the subscriber's use of offline charging services. The OCS 12 will thus have to aggregate sponsored usage over all subscribers offline charging data for settlement with the sponsor, which is a cumbersome process.

A further problem in the existing solution is that a great amount of requests for use of sponsored services may be received at the CTF 10 from individual users and that the OCS 12 will receive a corresponding number of requests for authorisation from the CTF 10 to access the sponsored services, thereby generating a great amount of traffic in the network.

SUMMARY

An object of the present invention is to solve, or at least mitigate this problem in the art, and thus to provide an improved method of managing online charging.

This object is attained in a first aspect of the invention by a method performed by a network node of managing online charging of sponsored data connectivity. The method comprises receiving a user request for service related to the sponsored data connectivity, estimating a number of users that are expected to use said service, and acquiring, from an Online Charging System authorizing access to the sponsored data connectivity, authorisation for the estimated number of users that are expected to use said service. The method further comprises granting the user access to the requested service with quota received with the authorisation from said Online Charging System (17), said quota being valid for a specified time period, and (6) further granting any further user requesting said service access to the requested service with quota received with the authorisation until total quota authorised by the Online Charging System (17) for the estimated number of users has been apportioned.

This object is attained in a second aspect of the invention by a network node configured to manage online charging of sponsored data connectivity, the network node comprising a processing unit and a memory, said memory containing instructions executable by said processing unit, whereby said network node is operative to receive a user request for service related to the sponsored data connectivity, estimate a number of users that are expected to use said service, acquire, from an Online Charging System authorizing access to the sponsored data connectivity, authorisation for the estimated number of users that are expected to use said service, and to grant the user access to the requested service with quota received with the authorisation from said Online Charging System, said quota being valid for a specified time period, and further to grant any further user requesting said service access to the requested service with quota received with the authorisation until total quota authorised by the Online Charging System for the estimated number of users has been apportioned.

This object is attained in a third aspect of the invention by a method performed by a network node of managing online charging of an account used in common by a group of users comprising receiving a user request for service to be charged to the common account, estimating a number of users that are expected to submit a request for service to be charged to the common account, acquire, from an Online Charging System authorizing service access, authorisation for the estimated number of users that are expected to submit the request for service to be charged to the common account, and granting the user access to the requested service with quota received with the authorisation from said Online Charging System, said quota being valid for a specified time period, and further granting any further user requesting service to be charged to the common account access to the requested service with quota received with the authorisation until total quota authorised by the Online Charging System for the estimated number of users has been apportioned.

This object is attained in a fourth aspect of the invention by a network node configured to manage online charging of an account used in common by a group of users, the network node comprising a processing unit and a memory, said memory containing instructions executable by said processing unit, whereby said network node is operative to receive a user request for service to be charged to the common account, estimate a number of users that are expected to submit a request for service to be charged to the common account, acquire, from an Online Charging System authorizing service access, authorisation for the estimated number of users that are expected to submit the request for service to be charged to the common account, and to grant the user access to the requested service with quota received with the authorisation from said Online Charging System, said quota being valid for a specified time period, and further to grant any further user requesting service to be charged to the common account access to the requested service with quota received with the authorisation until total quota authorised by the Online Charging System for the estimated number of users has been apportioned. Hence, in an embodiment, a network node in the form of e.g. a gateway, such as a PGW, which is equipped with CTF functionality for managing sponsored data connectivity, receives a user request for service related to the sponsored data connectivity. It is noted that the CTF for managing sponsored data connectivity may be arranged in the PGW together with a CTF managing "normal" subscriber online charging, and that these two CTFs are communicatively coupled to each other for exchanging charging-related data.

Upon registering that the user requests to utilize the service related to the sponsored data connectivity, the network node generates a charging event based on the observation of the user's network resource usage and forwards the charging event to an OCS authorizing access to the sponsored data connectivity.

Advantageously, before forwarding the charging event to the OCS of the sponsor, the network node estimates a number of users that are expected to use the requested service. The estimate may for instance be based on historical usage data.

Thereafter, the network node submits the charging event based on the estimate and thus acquires, from the OCS of the sponsor which authorizes access to the sponsored data connectivity, authorisation for the estimated number of users that are expected to use the requested service.

With the authorization received from the sponsor OCS, a quota is included specifying amount of network resources allowed to be consumed for the estimated number of user.

The network node will grant the user access to the requested service with the quota received with the authorisation from said Online Charging System, which quota is valid for a specified time period. The quota may e.g. specify the number of minutes or bytes allowed for the requested service.

Moreover, the network node grants any further user requesting the service access to the requested service with quota received with the authorisation. Each user may be apportioned its individual quota. However, it may also be envisaged that requesting users are apportioned equal-sized quotas, which advantageously would simplify the management of quota at the network node, in particular in a scenario where a great number of users requests access to a service.

The time period during which the quota is valid may be specified by the Online Charging System or the network node.

The further users requesting access to the service are apportioned quota until total quota authorised by the sponsor OCS for the estimated number of users has been apportioned to the requesting users, or that the specified time period for the quota has expired.

Advantageously, even though hundreds, thousands or even millions of users/devices—in particular with the advent of Internet of Things (JOT) and Machine Type Communication (MTC) devices—request access to the sponsored service, thereby creating a corresponding number of requests for network resource utilization to the network node, which may contain both the "normal" CTF and the sponsor CTF, only a single request for authorisation to use the service needs to be submitted to the OCS which authorizes access to the sponsored service.

In response thereto, the OCS which authorizes access to the sponsored service is only required to send, to the network node, an authorisation with allowed quota for the number of users as estimated by the network node. This will greatly reduce the amount of online charging sessions towards the sponsor OCS as well as the amount of traffic generated in the network between the network node comprising the CTFs and the sponsor OCS.

It should be noted that the above approach can be applied in a scenario where a group of users are requesting one or more services to be charged online from a common account. In such a scenario, the OCS authorizing access to the sponsored service would rather be denoted an "OCS authorizing access to a service charged from a common account".

In an embodiment, the network node reports, to the Online Charging System authorizing access to the sponsored data connectivity, total quota that has been consumed by the users requesting the service, when the total quota authorised by the Online Charging System for the estimated number of users has been apportioned, or the specified time period for the quota has expired.

In another embodiment, the network node estimates a new number of users that are expected to use the service and acquires, from the Online Charging System, authorisation for the new estimated number of users that are expected to use said service.

In a further embodiment, the network node records quota apportioned to each user requesting the service.

In yet an embodiment, the network node submits an inquiry to each user to report its consumed quota.

In yet another embodiment, the network node receives a report from each user indicating consumed quota of said each user.

In still an embodiment, the network node receives a request for the service from a user having consumed the apportioned quota, or having expired quota, and grants the user access to the requested service with a new apportioned quota.

In still another embodiment, the network node grants the users access to the requested service with quota exceeding the total quota authorised by the Online Charging System for the estimated number of users.

Advantageously, for services where users consume quota at a slow pace, in order to further reduce the number of interactions between the network node and the sponsor OCS, the network node may apply a factor (1<factor) to allow the network node to apportion further quota to the clients, such as a factor of 2 for apportioning twice as much quota as was originally granted by the sponsor OCS. This has the effect of both (a) avoiding requests for quota, which is likely to never be consumed in full by the users, from the OCS and (b) reduce the need for unnecessarily large quota being granted by the OCS.

In still another embodiment, the network node denies users grant to access the requested service in case said Online Charging System does not authorize the access, acquires a final service usage report from each user having accessed the service, and reports, to said Online Charging System, quota used by each user as defined in the respective final service usage report.

Further provided is a computer program comprising computer-executable instructions for causing the network node to perform steps according to an embodiment of a method of the invention, when the computer-executable instructions are executed on a processing unit included in the node.

Further provided is a computer program product comprising a computer readable medium, the computer readable medium having the computer program of the node embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
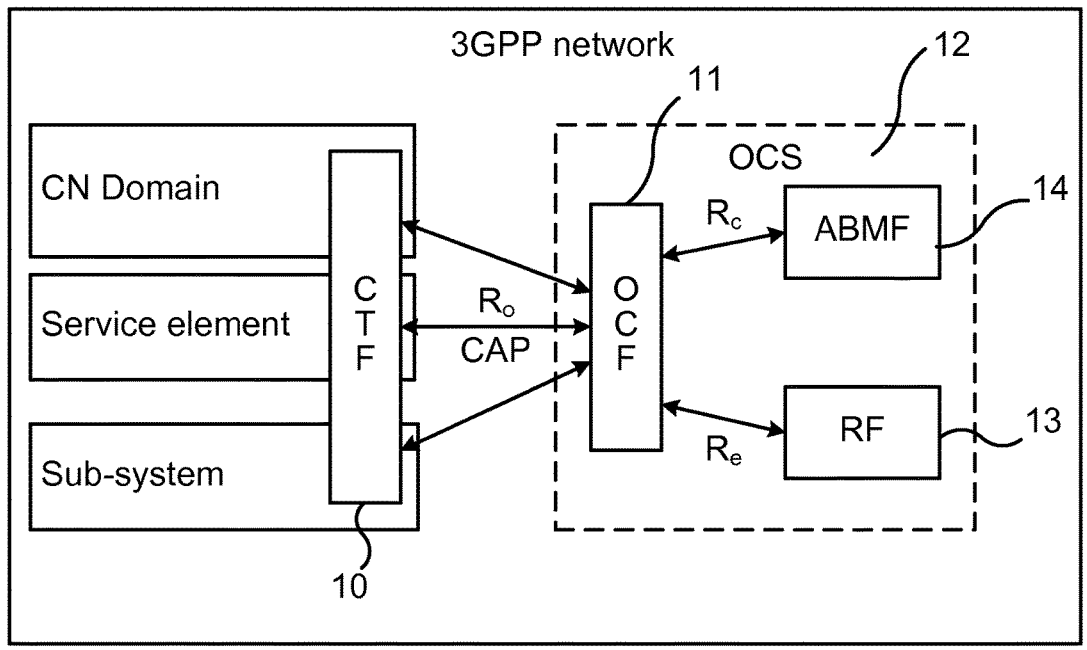
FIG. 1 illustrates a prior art online charging architecture of a 3GPP network.

FIG. 1 illustrates a prior art online charging architecture of a 3GPP network, the general principles of which previously have been discussed.

Figure 2:
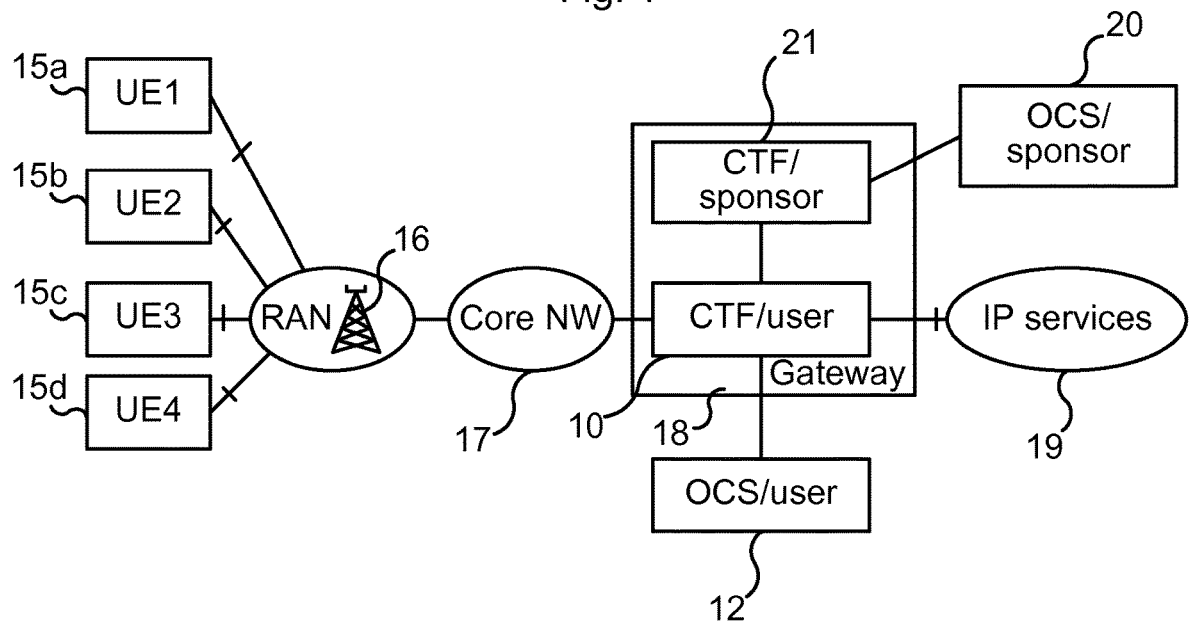
FIG. 2 illustrates a network node for managing online charging of sponsored data connectivity according to an embodiment.

FIG. 2 illustrates a network node 15 for managing online charging of sponsored data connectivity according to an embodiment.

Users illustrated by means of User Equipment (UEs) 15$a$-$d$, e.g. smart phones, tablets, smart watches, gaming consoles, laptops, etc., connect to a communication network via a base station 16, e.g. referred to in LTE as an eNodeB, forming a Radio Access Network (RAN), and further on to a so called core network 17. As an example, in LTE the core network is referred to as EPC, and comprises functional entities such as a Mobility Management Entity (MME), a Serving Gateway (SGW), a Home Subscriber Server (HSS), etc., not shown in FIG. 2.

Further, a Packet Data Network Gateway (PGW) 18 is included for providing connectivity to the UEs 15$a$-15$d$ to external Packet Data Networks (PDNs) 19 by being the point of exit and entry of traffic for the UEs with respect to the PDNs. A UE may have simultaneous connectivity with more than one PGW for accessing multiple PDNs, or multiple connections to a single PGW for accessing multiple PDNs.

As has been discussed with reference to FIG. 1, in online charging, a subscriber account located in an OCS 12 is queried prior to granting permission to use requested network resources. Thus, authorization for the network resource usage must be obtained by the network prior to the actual resource usage to occur. This authorization is granted by the OCS 12 upon request from the network.

As further was discussed in connection to FIG. 1, a CTF 10 is arranged in the PGW 18 for generating charging events based on the observation of a user's network resource usage and forwards the charging events to the OCS 12 in order to obtain authorisation for the chargeable event/network resource usage requested by the user. The CTF 10 and OCS 12 handling normal subscriber online charging is in the following referred to as CTF/user 10 and OCS/user 12, respectively.

Further illustrated in FIG. 2 is an OCS 20 responsible for online charging of sponsored data connectivity, which in the following will be referred to as OCS/sponsor 20.

In this embodiment, a further functional entity is introduced referred to as CTF/sponsor 21 communicatively coupled to both the CTF/user 10 and the OCS/sponsor 20.

Hence, as soon as the CTF/user 10 receives a user request for service related to sponsored data connectivity, the CTF/user 10 will direct the user request to the CTF/sponsor 21 being responsible for acquiring authorization from the OCS/sponsor 20 requested by the user 15a.

It is noted that the user request typically comprises an identifier designating the particular sponsor, i.e. a sponsor ID, for which the request is made, such that the PGW 18 can turn to the correct OCS/sponsor 20, as a plurality of sponsors typically are present in a network, all being addressable by the PGW 18.

It is further envisaged that the CTF/user 10 and CTF/sponsor 21 in an embodiment is implemented in a so called Machine Type Communications-InterWorking Function (MTC-IWFx) described e.g. in 3GPP specification TS 23.682, for handling service requests of MTC devices, in which case the "CTF/sponsor" rather would be referred to as "CTF/MTC" for handling a large group of MTC devices requesting services to be charged to a common account.

Figure 3:
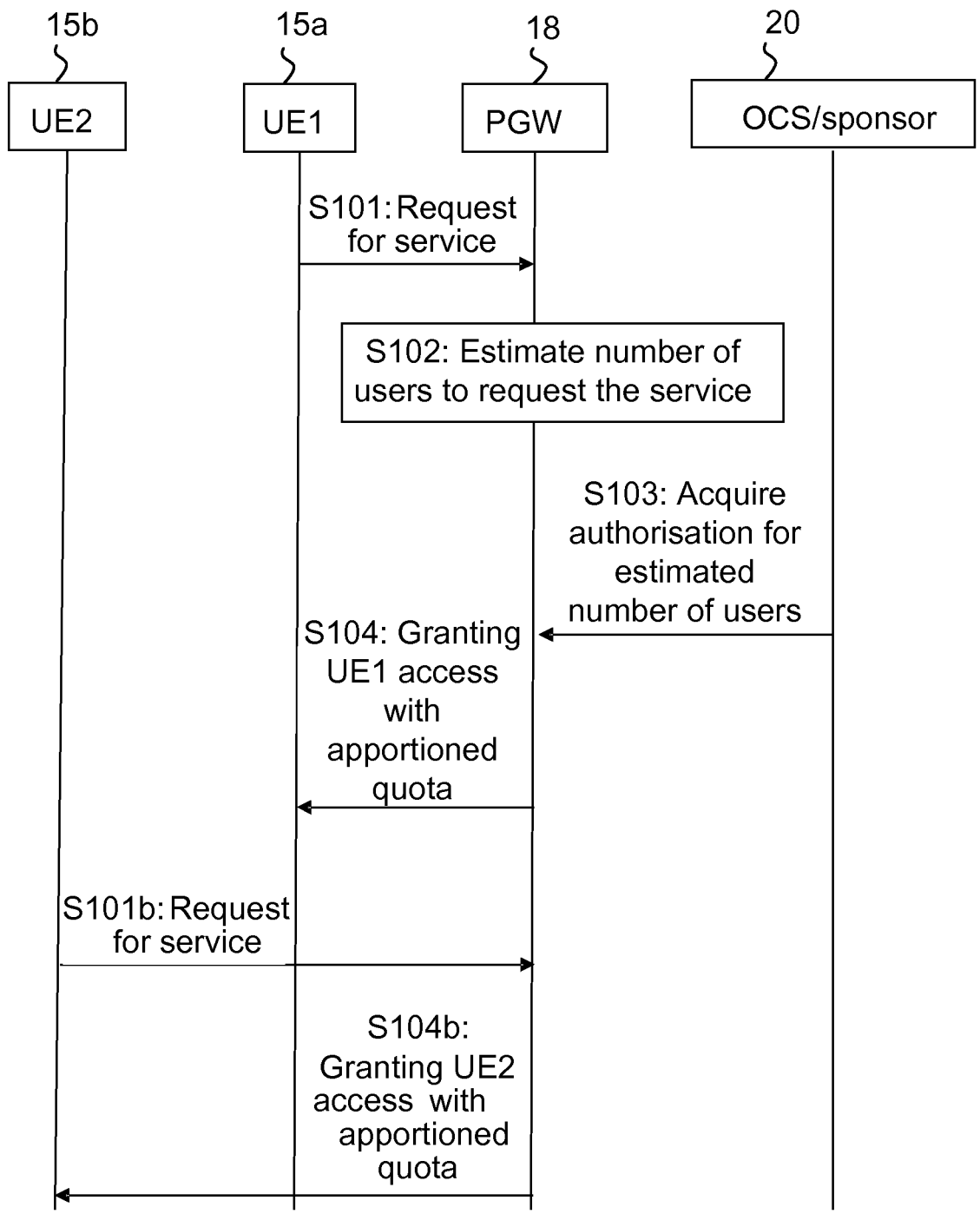
FIG. 3 illustrates a sequence diagram of a method performed by a network node configured to manage online charging of sponsored data connectivity according to an embodiment.

FIG. 3 illustrates a sequence diagram of a method performed by a network node configured to manage online charging of sponsored data connectivity according to an embodiment, where the network node is exemplified to be embodied by the PGW 18.

As has been discussed, the PGW 18 comprises the functional entities CTF/user 10 and CTF/sponsor 21, where any user request is received by the CTF/user 10. If the user request relates to normal online charging, the CTF/user 10 acquires authorization from the CTF/user 12, while if the user request relates to sponsored data connectivity, the user request is routed to the CTF/sponsor 21, which in its turn acquires authorization from the OCS/sponsor 20.

However, in the sequence diagram of FIG. 3, the communication is seen from the perspective of the PGW 18 rather than from the respective functional entity CTF/user 10 and CTF/sponsor 21.

In a first step S101, a user request for service related to the sponsored data connectivity is received by the PGW 18 from the first UE 15a, which request comprises a sponsor ID.

Upon receiving the user request from the first UE 15a, the PGW 18 estimates in step S102 a number of users that are expected to use the requested service, for instance by analysing historical data.

As an example, the estimated number of users that are expected to use the service over a particular time period amounts to 100, where the time period is set to e.g. the next 10 minutes.

Hence, the PGW 18 turns to the OCS/sponsor 20 indicated with the sponsor ID in step S103 for acquiring authorisation for the estimated number of users that are expected to use the requested service.

As an example, it is assumed that total quota received with the authorisation is 100×1 GB, where the requested service for instance may be to watch YouTube videos. Hence, a hundred users will be granted 1 GB of streamed YouTube videos each, the quota being valid over the next 10 minutes. The valid time period may be set by the OCS/sponsor 20 or by the PGW 18.

In step S104, the first UE 15a is thus granted access to the requested service with quota received with the authorisation from the OCS/sponsor 20, i.e. 1 GB over the next 10 minutes.

Now, upon receiving a further request for the service, as was expected with the estimation, exemplified by the second UE 15b requesting the service in step S101b, the PGW 18 will advantageously not turn to the OCS/sponsor 20 for acquiring authorization, but will in step S104b grant the second UE 15b access to the requested service with quota received with the authorisation from the OCS/sponsor 20, i.e. 1 GB over the next 10 minutes.

It is noted that that in a first scenario, each apportioned quota is valid for the particular time period set, i.e. each quota is valid for the next 10 minutes from the instance of apportionment. In such a scenario, the PGW 18 would typically be responsible for setting the time period specifying the validity of the apportioned quota. In a second scenario, each quota is valid for a specified time period counted from the instance when the OCS/sponsor 20 actually authorised the request. Hence, if the second UE 15b would make its request exactly one minute after the first UE 15a, the valid time period would amount to 10−1=9 minutes. In such a scenario, the OCS/sponsor 20 may be responsible for setting the time period specifying the validity of the apportioned quota. The PGW 18 typically keeps a record of quota apportioned to each user.

Thus, in this exemplifying embodiment, a hundred user service requests can be made to the PGW 18—and will be granted with the apportioned quota—while the PGW 18 only makes one single request for authorization to the OCS/sponsor 20, which advantageously will reduce the amount of traffic between the PGW 18 and the OCS/sponsor 20 greatly.

It is noted that the requests for service received by the PGW 18 not necessarily comes from users that previously have not made a service request. For instance, after the second UE 15b has made its request, the first UE 15a may again submit a service request; the first UE 15a may have used up the apportioned quota (or having expired quota), in which case the PGW 18 again will apportion quota to the first UE 15a, unless the total quota authorised by the OCS/sponsor 20 already has been apportioned or is expired.

In a further embodiment, it is envisaged that the PGW 18 grants the users access to the requested service with quota exceeding the total quota authorised by the OCS/sponsor 20 for the estimated number of users.

Assuming that the PGW 18 has apportioned the total 100×1 GB of quota that initially was authorised by the OCS/sponsor 20 for the estimated number of users in step S103, and that further requests for service are received by the PGW 18, the PGW 18 will in this particular embodiment grant the further requests and apportion additional quota to the requesting users. For instance, the PGW 18 may determine that another 50×1 GB is to be granted, thereby allowing a total quota of 150×1 GB.

Advantageously, this further reduces the number of interactions between the PGW 18 and the OCS/sponsor 20 in that no additional quota needs to be obtained by the PGW 18 from the OCS/sponsor 20 if for instance the actual number of users requesting a service exceeds the estimated number of users.

Figure 4:
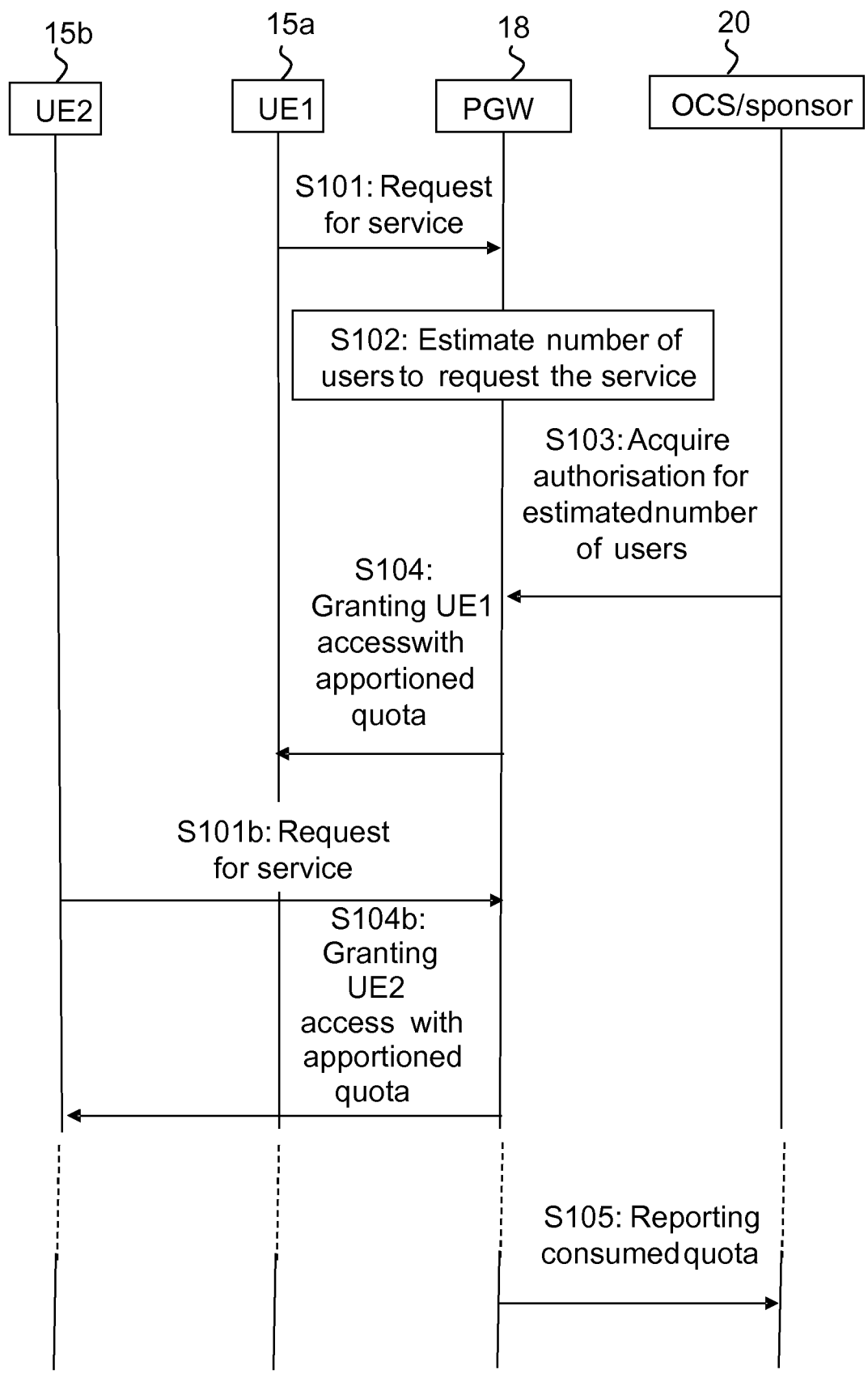
FIG. 4 illustrates a sequence diagram of a method performed by a network node configured to manage online charging of sponsored data connectivity according to a further embodiment.

FIG. 4 shows a sequence diagram being a continuation of that shown in FIG. 3, where a further embodiment is illustrated.

In this embodiment, after the total quota that was authorised by the OCS/sponsor 20 in step S103 for the estimated number of users has been consumed—or the specified time period for the quota has expired—the PGW 18 reports in step S105 total quota that has been consumed by the users requesting the service, such that the sponsor associated with the OCS/sponsor 20 advantageously can settle any billing related to the sponsored data connectivity, for instance by reimbursing the network operator for the user's data connectivity to the service provided by the sponsor. Further advantageous is that the resource usage of all the users requesting the service is reported at one occasion rather than repeatedly utilizing sporadic reporting for individual users.

Hence, in line with previous examples, it can be envisaged that (1) a total quota of 100×1 GB is reported to have been consumed, or that (2) in the 10 minutes that has expired, a lesser quota having been consumed, which lesser consumed quota thus is reported. Hence, either all apportioned quota has been consumed, or a subset of the apportioned quota has been consumed. Either way, consumed quota is reported to the OCS/sponsor 20

In one scenario, the PGW 18 assumes that quota apportioned to a user indeed has been consumed.

In an alternative scenario, the PGW 18 will acquire information from the respective user as to whether the user in fact has consumed its apportioned quota.

To this end, the PGW 18 records apportioned quota and subsequently submits an inquiry to a user, for instance upon expiry of apportioned quota, whether the apportioned quota in fact has been consumed by the user. Alternatively, the PGW 18 receives from each user a message indicating whether the quota actually has been consumed.

Figure 5:
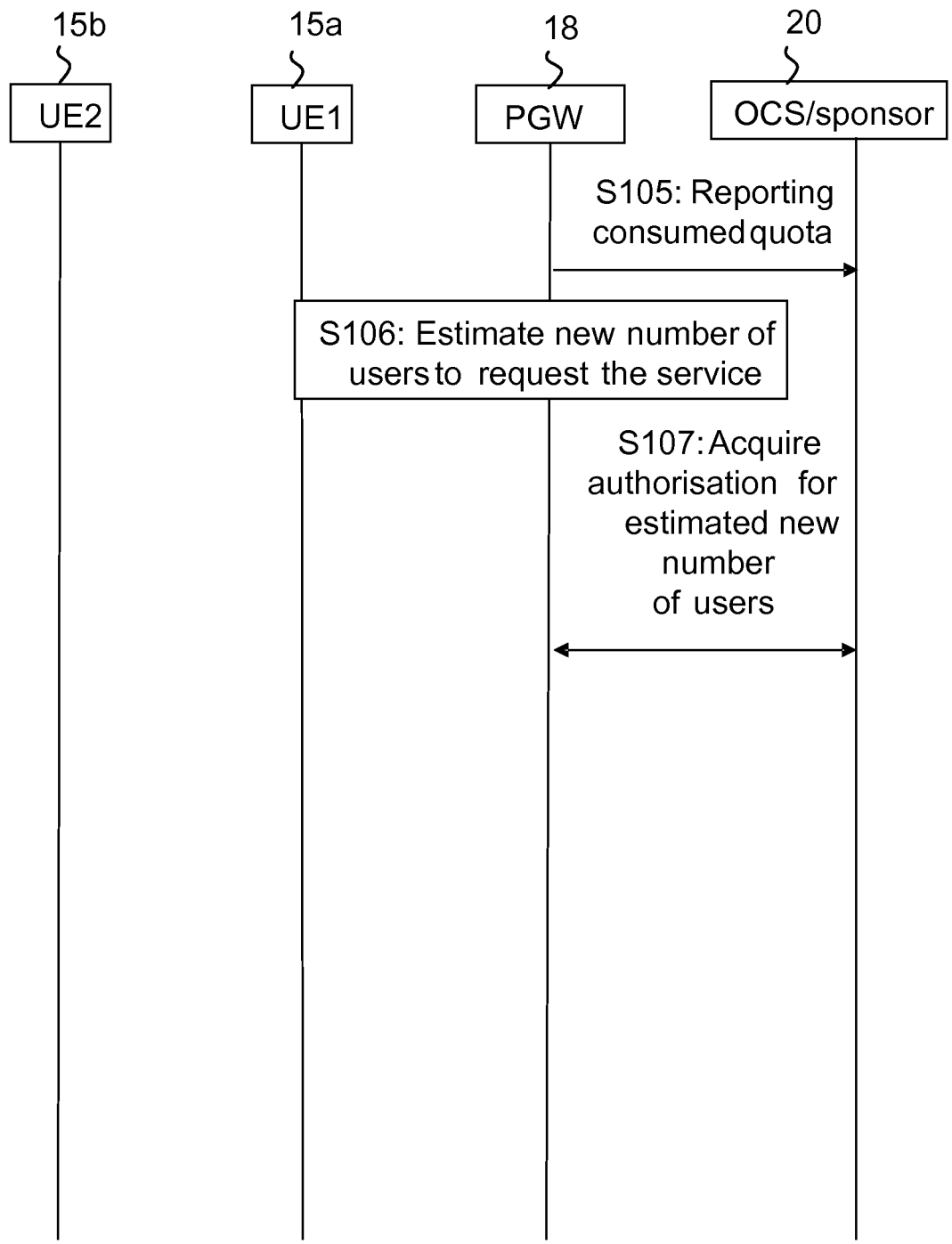
FIG. 5 illustrates a sequence diagram of a method performed by a network node configured to manage online charging of sponsored data connectivity according to yet a further embodiment.

FIG. 5 shows a further sequence diagram illustrating yet a further embodiment.

After the PGW 18 has reported consumed quota in step S105 to the OCS/sponsor 20, the PGW 18 estimates a new number of users that are expected to use the service in step S106.

Thereafter, in step S107, the PGW 18 acquires authorisation for the new estimated number of users that are expected to use the service from the OCS/sponsor 20 in step S107, and the process is repeated with apportioning new quota.

Thus, the PGW 18 may advantageously request further quota from the OCS/sponsor 20 even without having received any further user requests for the service. It is envisaged that the PGW 18 may acquire an indication, for instance by analysing network traffic, that further users are expected to use the service for which authorization and quota is acquired.

In still an embodiment, if the PGW 18 would request additional quota from the OCS/sponsor 20 without having performed the reporting in step S105 of the quota that has been consumed—and is denied authorisation by the OCS/sponsor 20—the PGW 18 accordingly denies any further users grant to access the requested service, acquires a final service usage report from each user having accessed the service, and reports to the OCS/sponsor 20 quota consumed by each user as defined in the respective final service usage report.

Again with reference to FIGS. 2 and 3, as previously has been mentioned, the above approach can be applied in a scenario where a group of users are requesting one or more services to be charged online from a common account. In such a scenario, the OCS/sponsor 20 which authorizes access to the sponsored service would rather be referred to as an "OCS authorizing access to a service charged from a common account", and be denoted OCS/common 20.

Hence, with reference again to the sequence diagram of FIG. 3, in a first step S101, a user request for service to be charged to a common account is received by the PGW 18 from the first UE 15a, which request comprises a service ID, or a common account ID.

Upon receiving the user request from the first UE 15a, the PGW 18 estimates in step S102 a number of users that are expected to request a service to be charged to the common account, for instance by analysing historical data. It is noted that different services may be associated with the same common account.

Again as an example, the estimated number of users that are expected to use one or more services associated with the common account over a particular time period amounts to 100, where the time period is set to e.g. the next 10 minutes.

Hence, the PGW 18 turns to the OCS/common 20 indicated with the service or account ID in step S103 for acquiring authorisation for the estimated number of users that are expected to use the requested service(s) associated with the common account.

As an example, it is assumed that total quota received with the authorisation is 100×1 minute, where the requested service for instance may be to make a phone call with one out of a number of cooperating telephone operators, which calls are to be charged to a common account. Hence, a hundred users will be granted a 1-minute telephone call, the quota being valid over the next 10 minutes, either from the instance in time where each apportionment of quota is made, or alternatively from the instance in time where the OCS/common authorizes access to the requested service, depending on application.

In step S104, the first UE 15a is thus granted access to the requested service with quota received with the authorisation from the OCS/common 20, i.e. 1 minute over the next 10 minutes.

Now, upon receiving a further request for the service, as was expected with the estimation, exemplified by the second UE 15b requesting the service in step S101b, the PGW 18 will advantageously not turn to the OCS/common 20 for acquiring authorization, but will in step S104b grant the second UE 15b access to the requested service with quota received with the authorisation from the OCS/common 20, i.e. a 1-minute phone call over the next 10 minutes.

Thus, in this exemplifying embodiment, a hundred user requests for service associated with the common account can be made to the PGW 18—and will be granted with the apportioned quota—while the PGW 18 only makes one single request for authorization to the OCS/common 20, which advantageously will reduce the amount of traffic between the PGW 18 and the OCS/common 20 greatly.

Figure 6:
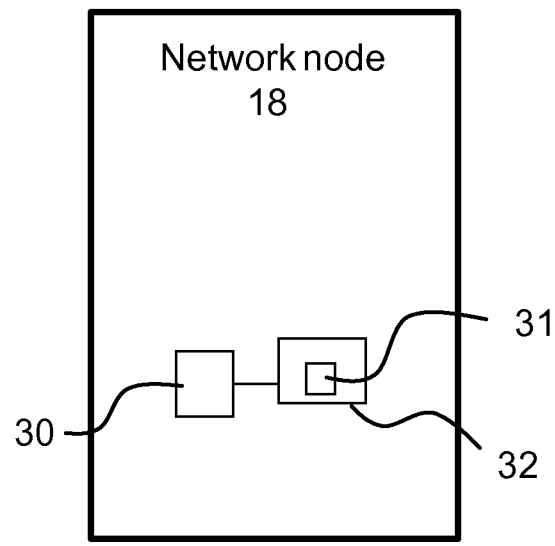
FIG. 6 illustrates a network node according to an embodiment.

With reference to FIG. 6, the steps of the method performed by the network node 18 according to embodiments are in practice performed by a processing unit 30 embodied in the form of one or more microprocessors arranged to execute a computer program 31 downloaded to a suitable storage medium 32 associated with the microprocessor, such as a Random Access Memory (RAM), a Flash memory or a hard disk drive. The processing unit 30 is arranged to cause the network nod 18 to carry out the method according to embodiments when the appropriate computer program 31 comprising computer-executable instructions is downloaded to the storage medium 32 and executed by the processing unit 30. The storage medium 32 may also be a computer program product comprising the computer program 31.

Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

Figure 7:
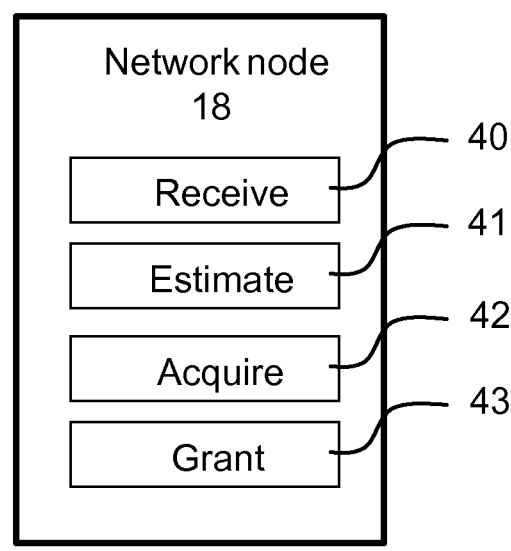
FIG. 7 illustrates a network node according to another embodiment.

FIG. 7 illustrates a network node 18 configured to manage online charging of sponsored data connectivity according to an embodiment The network node 18 comprises receiving means 40 adapted to receive a user request for service related to the sponsored data connectivity, estimating means 41 adapted to estimate a number of users that are expected to use the service, and acquiring means 42 adapted to acquire, from an Online Charging System authorizing access to the sponsored data connectivity, authorisation for the estimated number of users that are expected to use the service. The network node 18 further comprises granting means 43 adapted to grant the user access to the requested service with quota received with the authorisation from the Online Charging System, which quota is valid for a specified time period, and further to grant any further user requesting the service access to the requested service with quota received with the authorisation until total quota authorised by the Online Charging System for the estimated number of users has been apportioned.

The means 40-43 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node of managing online charging of sponsored data connectivity, comprising:
receiving a user request for service related to the sponsored data connectivity;
estimating a number of users that are expected to use said service;
acquiring, from an Online Charging System authorizing access to the sponsored data connectivity, authorization for the estimated number of users that are expected to use said service; and
granting the user access to the requested service with quota received with the authorization from said Online Charging System, said quota being valid for a specified time period, and further granting any further user requesting said service access to the requested service with quota received with the authorization until total quota authorized by the Online Charging System for the estimated number of users has been apportioned.

2. The method of claim 1, further comprising:
reporting, to the Online Charging System authorizing access to the sponsored data connectivity, total quota that has been consumed by the users requesting the service, when the total quota authorized by the Online Charging System for the estimated number of users has been apportioned, or the specified time period for the quota has expired.

3. The method of claim 2, further comprising:
estimating a new number of users that are expected to use said service;
acquiring, from said Online Charging System, authorization for the new estimated number of users that are expected to use said service.

4. The method of claim 1, further comprising:
recording quota apportioned to each user requesting said service.

5. The method of claim 4, further comprising:
submitting an inquiry to each user to report its consumed quota.

6. The method of claim 1, further comprising:
receiving a report from each user indicating consumed quota of said each user.

7. The method of claim 1, further comprising:
receiving a request for the service from a user having consumed the apportioned quota, or having expired quota; and
granting the user access to the requested service with a new apportioned quota.

8. The method of claim 1, further comprising:
granting the users access to the requested service with quota exceeding the total quota authorized by the Online Charging System for the estimated number of users.

9. The method of claim 1, further comprising:
denying users grant to access the requested service in case said Online Charging System does not authorize the access;
acquiring a final service usage report from each user having accessed the service; and
reporting, to said Online Charging System, quota used by each user as defined in the respective final service usage report.

10. A computer program product comprising a non-transitory computer readable medium storing a computer program comprising computer-executable instructions for causing a network node to perform the method of claim 1 when the computer-executable instructions are executed on a processing unit included in the network node.

11. A method performed by a network node of managing online charging of an account used in common by a group of users, comprising:
receiving a user request for service to be charged to the common account;
estimating a number of users that are expected to submit a request for service to be charged to the common account;
acquiring, from an Online Charging System authorizing service access, authorization for the estimated number of users that are expected to submit the request for service to be charged to the common account;

granting the user access to the requested service with quota received with the authorization from said Online Charging System, said quota being valid for a specified time period, and further granting any further user requesting service to be charged to the common account access to the requested service with quota received with the authorization until total quota authorized by the Online Charging System for the estimated number of users has been apportioned.

12. A network node configured to manage online charging of sponsored data connectivity, the network node comprising:
a processing unit; and
a memory, said memory containing instructions executable by said processing unit, wherein said network node is operative to:
receive a user request for service related to the sponsored data connectivity;
estimate a number of users that are expected to use said service;
acquire, from an Online Charging System authorizing access to the sponsored data connectivity, authorization for the estimated number of users that are expected to use said service; and
grant the user access to the requested service with quota received with the authorization from said Online Charging System, said quota being valid for a specified time period, and further granting any further user requesting said service access to the requested service with quota received with the authorization until total quota authorized by the Online Charging System for the estimated number of users has been apportioned.

13. The network node of claim 12, further being operative to:
report, to the Online Charging System authorizing access to the sponsored data connectivity, total quota that has been consumed by the users requesting the service, when the total quota authorized by the Online Charging System for the estimated number of users has been apportioned, or the specified time period for the quota has expired.

14. The network node of claim 13, further being operative to:
estimate a new number of users that are expected to use said service;
acquire, from said Online Charging System, authorization for the new estimated number of users that are expected to use said service.

15. The network node of claim 13, further being operative to:
submit an inquiry to each user to report its consumed quota.

16. The network node of claim 12, further being operative to:
receive a report from each user (15a-d) indicating consumed quota of said each user.

17. The network node of claim 12, further being operative to:
receive a request for the service from a user having consumed the apportioned quota, or having expired quota; and
grant the user access to the requested service with a new apportioned quota.

18. The network node of claim 12, further being operative to:
grant the users access to the requested service with quota exceeding the total quota authorized by the Online Charging System for the estimated number of users.

19. The network node of claim 12, further being operative to:
deny users grant to access the requested service in case said Online Charging System does not authorize the access;
acquire a final service usage report from each user having accessed the service; and
report, to said Online Charging System, quota used by each user as defined in the respective final service usage report.

20. A network node configured to manage online charging of an account used in common by a group of users, the network node comprising:
a processing unit; and
a memory, said memory containing instructions executable by said processing unit, wherein said network node is operative to:
receive a user request for service to be charged to the common account;
estimate a number of users that are expected to submit a request for service to be charged to the common account;
acquire, from an Online Charging System authorizing service access, authorization for the estimated number of users that are expected to submit the request for service to be charged to the common account; and
grant the user access to the requested service with quota received with the authorization from said Online Charging System, said quota being valid for a specified time period, and further granting any further user requesting service to be charged to the common account access to the requested service with quota received with the authorization until total quota authorized by the Online Charging System for the estimated number of users has been apportioned.

* * * * *